Oct. 8, 1935.  A. E. DE KONING  2,016,799
TRIMMER SAW
Filed Oct. 10, 1934
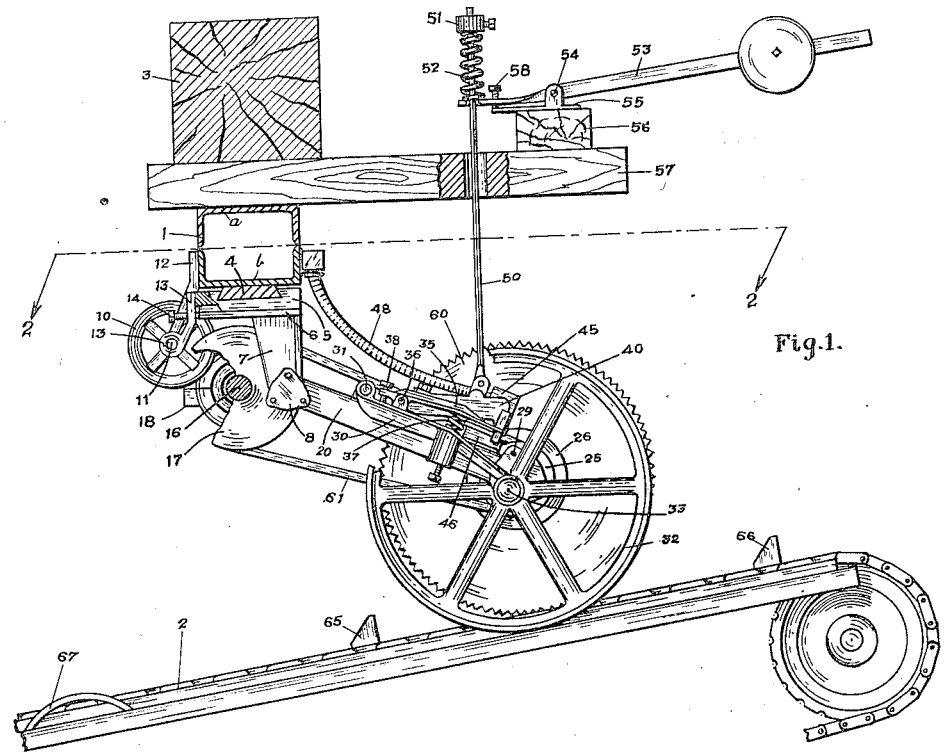
Fig. 1.
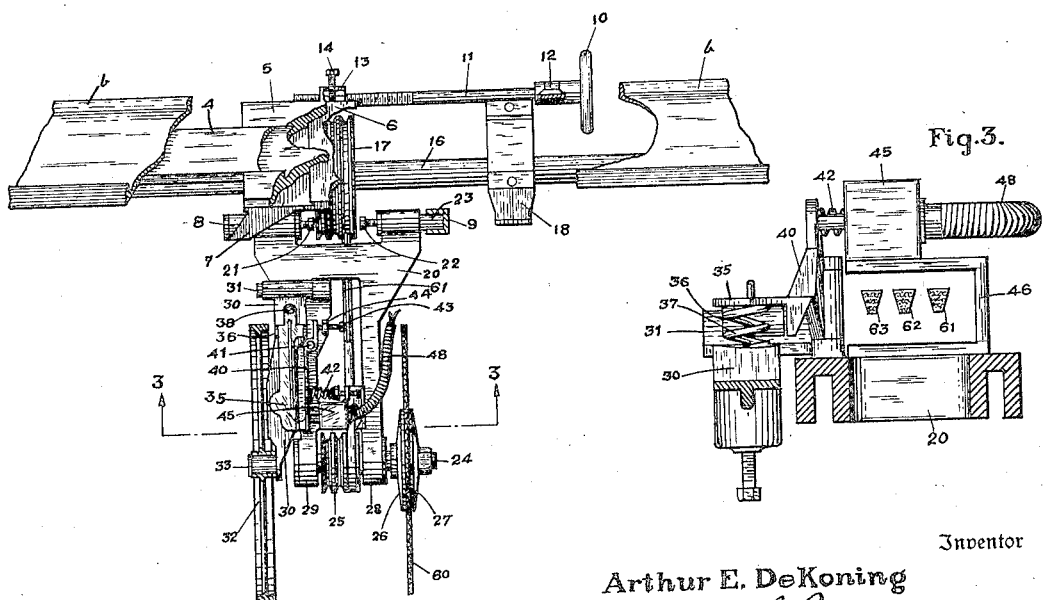
Fig. 2.
Fig. 3.
Inventor
Arthur E. DeKoning
By Rudolph B. Prentice
Attorney Patented Oct. 8, 1935

2,016,799

UNITED STATES PATENT OFFICE 2,016,799

TRIMMER SAW

Arthur E. De Koning, Portland, Oreg.

Application October 10, 1934, Serial No. 747,689

4 Claims. (Cl. 143—41)

My invention relates to improvements in trimmer saws, in which constantly rotating circular saws are engaged by remote control means with the wood stock to be trimmed in transit thereunder on conveyor chains, and more particularly to the said remote control means and the mechanism making the same possible.

The principal object of my invention is to provide a trimmer saw capable of fine work and nice adjustment adapted to the work of accurately trimming lumber for its ultimate use.

A second object is to provide a trimmer saw economical of maintenance.

A third object is the provision of a trimmer saw of relatively small cost and weight and one which may be readily installed without extensive planning.

Other objects and advantages of my invention will be apparent in the following discourse wherein the several elements are described in detail.

My invention resides in the means devised to control the operation of power derived from the conveyor chains in lifting the rotating saw free of the stock through the mechanism shown and described.

Figure 1 represents a view of the side of the machine from which parts have been broken away to reveal parts normally obscured thereby.

Figure 2 represents a view of the top of the mechanism below the line 2—2 of Figure 1, parts thereof having been broken away to reveal parts normally obscured.

Figure 3 represents a view of a fragmentary section on the line 3—3 of Figure 2, particularly illustrating the relationship of parts not otherwise apparent.

A longitudinal beam 1, conveniently formed of two channels a and b, is disposed above and transversely of the trimmer table conveyor chains as 2 and secured to the building structure as the timber 3. On the under side of the beam 1 is a dovetail slide-way 4 rigidly secured thereto.

An adjustable hanger comprises a longitudinal slide 5 engaging the slide-way 4, and a transverse slide 6 formed with a dovetail engaging a way therefor in the longitudinal slide 5. This transverse slide 6 is further formed with two symmetrically disposed hanger arms as 7 depending therefrom and terminating in two aligned journals 8 and 9.

A hand-wheel 10 with screw 11 attached is journaled in a bracket 12 rigidly secured to the beam 1 and serves as a convenient means for adjusting the longitudinal slide 5 formed with a depending arm 13 containing the female thread for the screw 11. A screw 14 engaging a thread in the arm 13 serves to adjust the transverse slide 6 forward.

A power driven shaft 16 carrying the V-belt pulley 17 is journaled in suitable hangers as 18 secured to the beam 1.

An arbor frame 20 is pivotally mounted in the journals 8 and 9 and may be critically adjusted therebetween by means of the screws 21 and 22 which operate to extend the stub-shafts as 23 in opposite directions. A saw arbor 24 as usually composed with pulley 25 and saw-collars 26 and 27 is journaled at the extremities 28 and 29 of the arbor frame.

A wheel-arm 30 is pivotally mounted upon the arbor frame by means of the stud 31 the axis of which is parallel to that of the stub-shafts as 23. At the outermost extremity of this wheel-arm 30, a wheel 32 is rotatably mounted upon the stud 33 in turn rigidly secured to the wheel-arm 30.

A resiliently mounted stop 35 is mounted upon the wheel-arm 30 upon a pivot 36 the axis of which is disposed parallel to those of the stub-shaft 23 and the stud 31. At the forward end of this stop 35 a spring 37 bears against the under side thereof to force the same upward to the extreme limit of movement thereof as gaged by the screw 38 threaded through a rearward extension of the piece and bearing upon the upper face of the wheel-arm 30.

A latch 40 mounted upon a stud 41 secured to the arbor-frame 20 is urged by the spring 42 to the extreme limit of travel thereof as gaged by the screw 43 threaded through a suitable protuberance 44 integral with the arbor frame 20 and bearing upon a rearward extension of the latch 40.

An electric solenoid 45 is rigidly secured to a channel shaped support 46 in turn rigidly mounted upon the arbor-frame 20. The plunger of this solenoid is attached to the latch 40 and operates to move the latter to compress the spring 42 when the solenoid is charged. A flexible conduit 48 extending between the solenoid 45 and the stationary control button and power source 45 not shown contains the necessary wiring.

To limit the downward movement of the arbor-frame 20 and parts attached thereto, a resilient stop is provided comprising, a rod 50 pivotally secured to the arbor-frame 20 at its lower end and fitted with a set-collar 51 and buffer-spring 52, and a counterweighted lever 53 pivoted at 54 to a suitable bracket 55 in turn secured to convenient structure as 56 and 57. A screw 58 provides for fine adjustment of the normal elevation of the arbor-frame 20.

The saw-arbor upon which the saw 60 is mounted is driven by V-belts 61, 62, and 63, engaging the pulleys 17 and 25.

As the lumber to be trimmed is carried upward the saw by the conveyor chains as 2 engaged by the dogs as 65 and 66 the jogger 67 is encountered and the motion of that portion of the stick in contact therewith is retarded until engaged firmly by the dogs of several chains carrying the piece, thus insuring the proper alignment of the piece to be cut.

In the normal adjustment of the device, the lumber thus in motion, first contacts the wheel 32 normally disposed as illustrated in Figure 1. Continued motion of the lumber causes the wheel 32 to rise carrying with it the arbor-frame 20 engaged in this motion by the stop 35 and latch 40 so adjusted as to provide for the relative positions of the wheel 32 and saw 60 illustrated in Figure 1.

Further motion of the conveyor chains as 2 carries the lumber beyond the saw without being cut.

When it is desired to engage the saw with the lumber in transit over the chains as 2, the solenoid 45 is charged by operating a push-button or other convenient device for connecting the solenoid 45 to an electrical power source.

When the solenoid 45 is thus charged, the plunger thereof actuates the latch 40 in motion about its pivot to compress the spring 42, thus disengaging the latch 40 from the stop 35.

As the next piece of lumber contacts the wheel 32 the latter rises independently of the arbor-frame 20 and the saw 60 remains at its lowermost position where it engages the lumber as it passes, thus effecting the cut at the will of the operator.

When the cut has been made, further motion of the lumber on the chains as 2 occasions the descent of the wheel 32 and wheel-arm 30 moving about its pivot at 31. This descent of the wheel 32 causes the re-engagement of the latch and stop 40 and 35 respectively, thus returning the device to normal adjustment.

It will be evident that the solenoid need be charged only momentarily as when the wheel 32 begins to rise, the latch and stop may not be re-engaged until the wheel 32 again descends to its normal position.

It is also to be observed that the device may be used automatically to trim certain short lengths which do not extend under the wheel 32, while longer lengths which do extend under the wheel may be trimmed or not at the election of the operator.

As is common in the art, these saws may be arranged in a series so that the lumber on the trimmer table may be cut to desired lengths as the character of the stock warrants.

In this manner of use a series of saws are individually connected electrically to a control panel having a series of push-button controls, each controlling a saw, or each controlling combinations of saws that will effect the cutting of specified lengths as prearranged by proper electrical connections permanently or temporarily established as conditions require.

The screw 11 provides for critical adjustment of saw spacing to take care of varying widths of kerf or other factors, while the screw 14 provides for properly tensioning the belts 61, 62, and 63.

Adjustments of the tension of the springs, and of the amplitudes of movement of the latch, stop, and arbor-frame, are all provided for and constitute practical refinements of great value in the maintenance of the saws in critical adjustment for the accurate trimming of stock suited for ultimate use.

Having described my invention, what I claim is:

1. A trimmer saw comprising, a pivotally mounted arbor-frame carrying a power-driven circular saw, a resilient support for said arbor-frame, a wheel-arm pivotally mounted on said arbor-frame carrying a wheel slightly larger in diameter than said saw, a resilient stop pivotally mounted on said wheel-arm, a solenoid operated latch pivotally mounted on said arbor-frame adapted in its normal adjustment to engage said stop on said wheel arm, and means conveniently located to control said latch.

2. A trimmer saw comprising, a trimmer table fitted with conveyor means to propel lumber thereover, an arbor-frame mounted above said table, a power-driven saw journaled in said arbor-frame, a wheel-arm pivotally mounted on said arbor frame, a wheel slightly larger in diameter than said saw mounted on said wheel-arm to rotate on an axis parallel to that of the said saw, a resilient stop pivotally mounted on said wheel-arm, an adjustable latch pivotally mounted on said arbor-frame and normally engaging said stop, a solenoid mounted on said arbor-frame the plunger of which is attached to said latch, control means to operate said solenoid and said latch conveniently situated, and suitable electrical connections between said control means and said solenoid.

3. A trimmer saw comprising, conveyor means to carry lumber transversely of its length, a jogger disposed adjacent said conveyor means consisting in an inclined way over which the lumber must travel, a pivotally mounted arbor-frame carrying a power-driven circular saw, a resilient support for said arbor-frame, a wheel-arm pivotally mounted on said arbor-frame carrying a wheel slightly greater in diameter than said saw, a resilient stop pivotally mounted on said wheel-arm, a solenoid operated latch pivotally mounted on said arbor-frame adapted in its normal adjustment to engage said stop on said wheel arm, and means conveniently located to control said latch.

4. A trimmer saw comprising, conveyor means having spaced dogs to positively engage lumber in transit thereon, a jogger disposed intermediately of the ends of said conveyor consisting of an inclined way adapted to elevate lumber passing thereover above said conveyor and thereby arrest the motion of said lumber until positively engaged by said dogs, a pivotally mounted arbor-frame carrying a power-driven circular saw, a resilient support for said arbor-frame, a wheel-arm pivotally mounted on said arbor-frame carrying a wheel slightly greater in diameter than said saw, a resilient stop pivotally mounted on said wheel-arm, a solenoid operated latch pivotally mounted on said arbor-frame adapted in its normal adjustment to engage said stop on said wheel-arm, and means conveniently located to control said latch.

ARTHUR E. DE KONING.